US012755358B2

(12) United States Patent
Jhuang et al.

(10) Patent No.: US 12,755,358 B2
(45) Date of Patent: Oct. 6, 2026

(54) HDR TONE MAPPING SYSTEM AND METHOD WITH SEMANTIC SEGMENTATION

(71) Applicant: MEDIATEK INC., Hsin-Chu (TW)

(72) Inventors: Huei-Han Jhuang, Hsinchu City (TW); Jan-Wei Wang, Hsinchu City (TW); Po-Yu Huang, Hsinchu City (TW); Ying-Jui Chen, Hsinchu City (TW); Chi-Cheng Ju, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 353 days.

(21) Appl. No.: 18/232,805

(22) Filed: Aug. 10, 2023

(65) Prior Publication Data

US 2025/0054119 A1 Feb. 13, 2025

(51) Int. Cl.
*G06T 5/92* (2024.01)

(52) U.S. Cl.
CPC ...... *G06T 5/92* (2024.01); *G06T 2207/20192* (2013.01); *G06T 2207/20208* (2013.01)

(58) Field of Classification Search
CPC ............. G06T 5/92; G06T 2207/20192; G06T 2207/20208
See application file for complete search history.

(56) References Cited

U.S. PATENT DOCUMENTS

| | | | | |
|---|---|---|---|---|
| 9,275,445 | B2 | 3/2016 | Granados | |
| 2016/0286226 | A1* | 9/2016 | Ridge | H04N 19/30 |
| 2022/0076395 | A1* | 3/2022 | Amthor | G06T 7/11 |
| 2023/0343025 | A1* | 10/2023 | Ha | G06T 19/006 |

FOREIGN PATENT DOCUMENTS

| | | | | |
|---|---|---|---|---|
| JP | 2015164512 | A * | 9/2015 | G06T 5/50 |

OTHER PUBLICATIONS

Michaël Gharbi, Jiawen Chen, Jonathan T. Barron, Samuel W. Hasinoff, and Fredo Durand. 2017. Deep bilateral learning for real-time image enhancement. ACM Trans. Graph. 36, 4, Article 118 (Aug. 2017), 12 pages. https://doi.org/10.1145/3072959.3073592 (Year: 2017).*

Aydinlilar, M. (2021). Visual Similarity for HDR Images with Applications to Tone Mapping (Doctoral dissertation, Middle East Technical University (Turkey)). (Year: 2021).*

Durand, "Fast Bilateral Filtering for the Display of High-Dynamic-Range Images", ACM Transactions on Graphics, vol. 21, Issue 3, pp. 257-266, Jul. 1, 2002.

* cited by examiner

*Primary Examiner* — Andrew M Moyer
*Assistant Examiner* — Conor A O'Malley
(74) *Attorney, Agent, or Firm* — Winston Hsu

(57) ABSTRACT

A HDR tone mapping system includes several modules. A semantic segmentation module is used to extract semantic information from the input image. An image decomposition module is used to decompose the input image to a high-bit base layer and a detail layer. A statistics module is used to generate statistics of pixels of the input image according to the semantic information. A curve computation module is used to generate a tone curve from the statistics. A compression module is used to compress the high-bit base layer to a low-bit base layer according to the tone curve, the statistics and the semantic information. A detail adjustment module is used to tune the detail layer according to the semantic information and the statistics to generate an adjusted detail layer. An image reconstruction module is used to combine the adjusted detail layer and the low-bit base layer to generate an output image.

18 Claims, 10 Drawing Sheets

Without semantic information

With semantic information

Without semantic information

With semantic information

HDR TONE MAPPING SYSTEM AND METHOD WITH SEMANTIC SEGMENTATION

BACKGROUND

High dynamic range (HDR) imaging is a technique that captures images with a wide range of brightness levels, from very dark to very bright. This allows for more details and contrast in both shadows and highlights, which are often lost in conventional imaging methods. High dynamic range imaging can be achieved by combining multiple exposures of the same scene with different exposure settings, or by using sensors and algorithms that can capture and process a high dynamic range of light intensities. It has applications in various fields, such as photography, astronomy, medical imaging, and computer graphics.

When an HDR image is generated, it can be a challenge to display the HDR image on a standard dynamic range (SDR) display medium with satisfactory result. The challenge comes primarily from the lack of dynamic range in the SDR display medium. This challenge can typically be addressed by tone mapping, which maps the HDR content to the limited displayable range, while retaining as much of its original contrast as possible. In fact, tone mapping transforms the colors and brightness of an image or a video to make it more suitable for display on different devices or media. It can enhance the contrast, saturation, and details of an image or a video, as well as reduce artifacts such as noise, banding, or clipping. Typical HDR tone mapping algorithms involve decomposing an input high-bit image into a base layer corresponding to large-scale luminance, and a detail layer corresponding to texture and noise.

However, typical tone mapping algorithm is not semantic aware, which is a term for describing systems or models that can understand the meaning of the data they are processing. (Semantic-aware systems can perform a variety of tasks that require understanding the meaning of data, such as image recognition.) Specifically, sharp edge boundaries in the image do not always correspond to semantic boundaries. For example, the black and white patches in a checkerboard (a semantic object) have sharp boundaries. These sharp boundaries are not smoothed by edge-preserving filters and retained in the base layer. After tone mapping, the contrast of the checkerboard is likely to reduce because the white patch is compressed more than the dark patch.

Another drawback is that there is a tradeoff using a global curve compression on an image. The global curve compresses the contrast of both bright objects and dark objects in the image, and it often results in the tradeoff between the satisfactory appearance of the bright objects and the dark objects.

SUMMARY

An embodiment provides a HDR (High Dynamic Range) tone mapping system including a semantic segmentation module, an image decomposition module, a statistics module, a curve computation module, a compression module, a detail adjustment module, and an image reconstruction module. The semantic segmentation module is used to receive an input image and extract semantic information from the input image. The image decomposition module is used to receive the input image and decompose the input image to a high-bit base layer and a detail layer according to the semantic information. The statistics module is used to generate statistics of pixels of the input image according to the semantic information. The curve computation module is used to generate a tone curve according to the statistics of the pixels. The compression module is used to compress the high-bit base layer to a low-bit base layer according to the tone curve, the statistics and the semantic information. The detail adjustment module is used to tune the detail layer according to the semantic information and the statistics to generate an adjusted detail layer. The image reconstruction module is used to combine the adjusted detail layer and the low-bit base layer to generate an output image.

An embodiment provides a HDR tone mapping method implemented by a computer. The method includes receiving an input image and extracting semantic information from the input image, decomposing the input image to a high-bit base layer and a detail layer according to the semantic information, generating statistics of pixels of the input image according to the semantic information, generating a tone curve according to the statistics of the pixels, compressing the high-bit base layer to a low-bit base layer according to the tone curve, the statistics and the semantic information, tuning the detail layer according to the semantic information and the statistics to generate an adjusted detail layer, and combining the adjusted detail layer and the low-bit base layer to generate an output image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
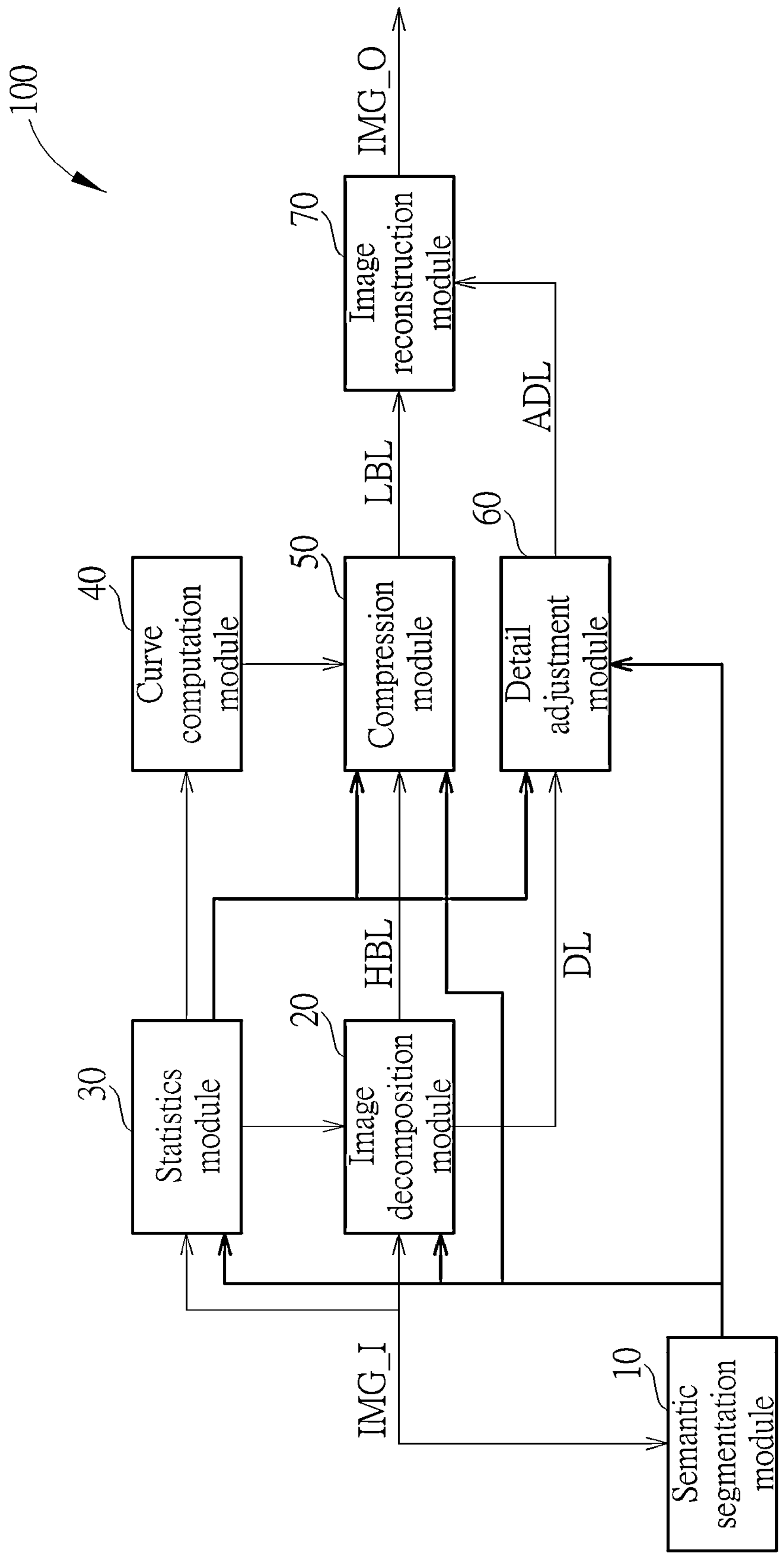
FIG. 1 illustrates a HDR tone mapping system of an embodiment of the present invention.

Disclosed herein is a HDR (High Dynamic Range) tone mapping system and method incorporating semantic segmentation techniques. FIG. 1 illustrates a HDR tone mapping system 100 of an embodiment of the present invention. The HDR tone mapping system 100 includes a semantic segmentation module 10, an image decomposition module 20, a statistics module 30, a curve computation module 40, a compression module 50, a detail adjustment module 60, and an image reconstruction module 70. The semantic segmentation module 10 is used to receive an input image and extract semantic information from the input image IMG_I. The image decomposition module 20 is used to receive the input image IMG_I and decompose the input image IMG_I to a high-bit base layer HBL and a detail layer DL according to the semantic information. The statistics module 30 is used to generate statistics of pixels of the input image IMG_I according to the semantic information. The curve computation module 40 is used to generate a tone curve according to the statistics of the pixels. The compression module 50 is used to compress the high-bit base layer HBL to a low-bit base layer LBL according to the tone curve, the statistics and the semantic information. The detail adjustment module 60 is used to tune the detail layer DL according to the semantic information and the statistics to generate an adjusted detail layer ADL. The image reconstruction module 70 is used to combine the adjusted detail layer ADL and the low-bit base layer LBL to generate an output image IMG_O.

It should be noted that the input image IMG_I can be an HDR image that has 18 bits to 24 bits per pixel, and the output image IMG_O can be an SDR image that has 8 bits to 12 bits per pixel.

Figure 2:
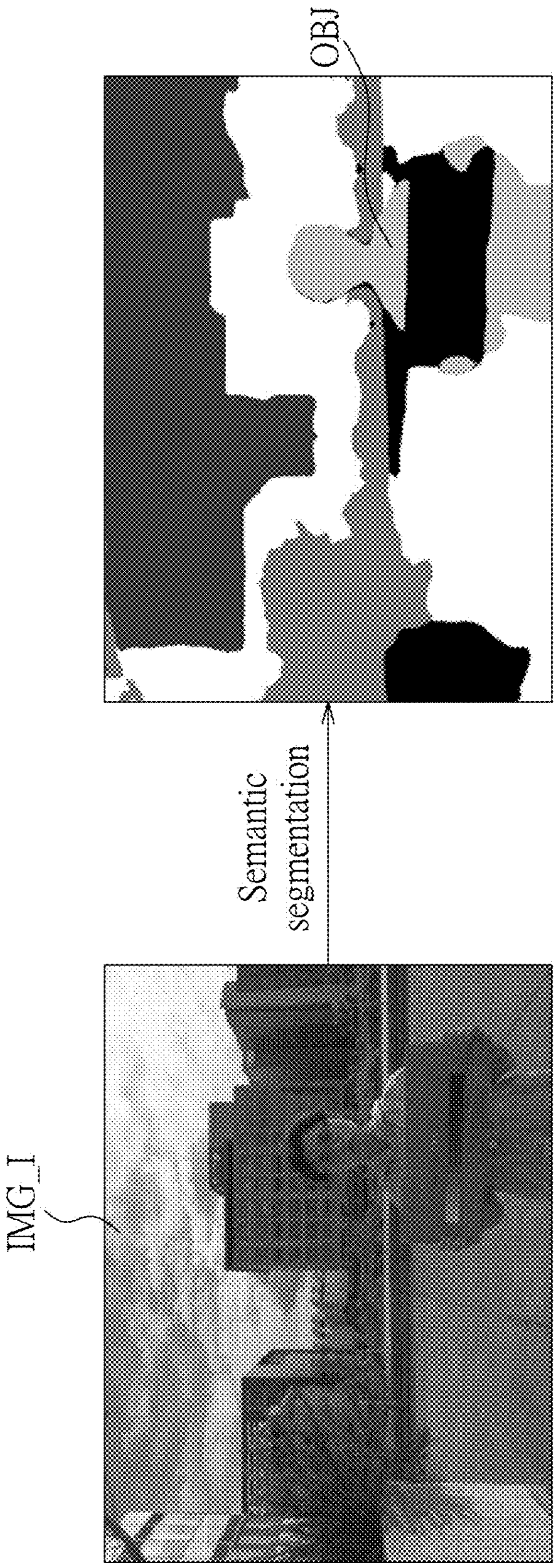
FIG. 2 illustrates an exemplary process of the semantic segmentation module of the HDR tone mapping system in FIG. 1 extracting semantic information from the input image.

FIG. 2 illustrates an exemplary process of the semantic segmentation module 10 extracting semantic information from the input image IMG_I. The semantic segmentation module 10 may include fully convolutional network (FCN), U-Net, SegNet, Deeplab and/or other commonly used semantic models. In general, semantic segmentation is a computer vision task that involves assigning a label to each pixel in an image based on its semantic meaning. For example, in an image of a street scene, semantic segmentation can identify and separate different objects such as cars, pedestrians, buildings, and roads. Semantic segmentation can be useful for various applications such as autonomous driving, medical image analysis, and scene recognition. For example, in the input image IMG_I in FIG. 2, semantic segmentation module can identify pixels that belong to sky, person, buildings, floor, etc. and assign the corresponding label to each pixel. This process is called semantic labeling. The sky, person, buildings, etc. are called semantic objects. The semantic information here includes the semantic labels and the semantic objects. The semantic information would be used in assisting HDR tone mapping described in the following paragraphs and for illustration purpose, the semantic object OBJ would be used as the example.

Figure 3:
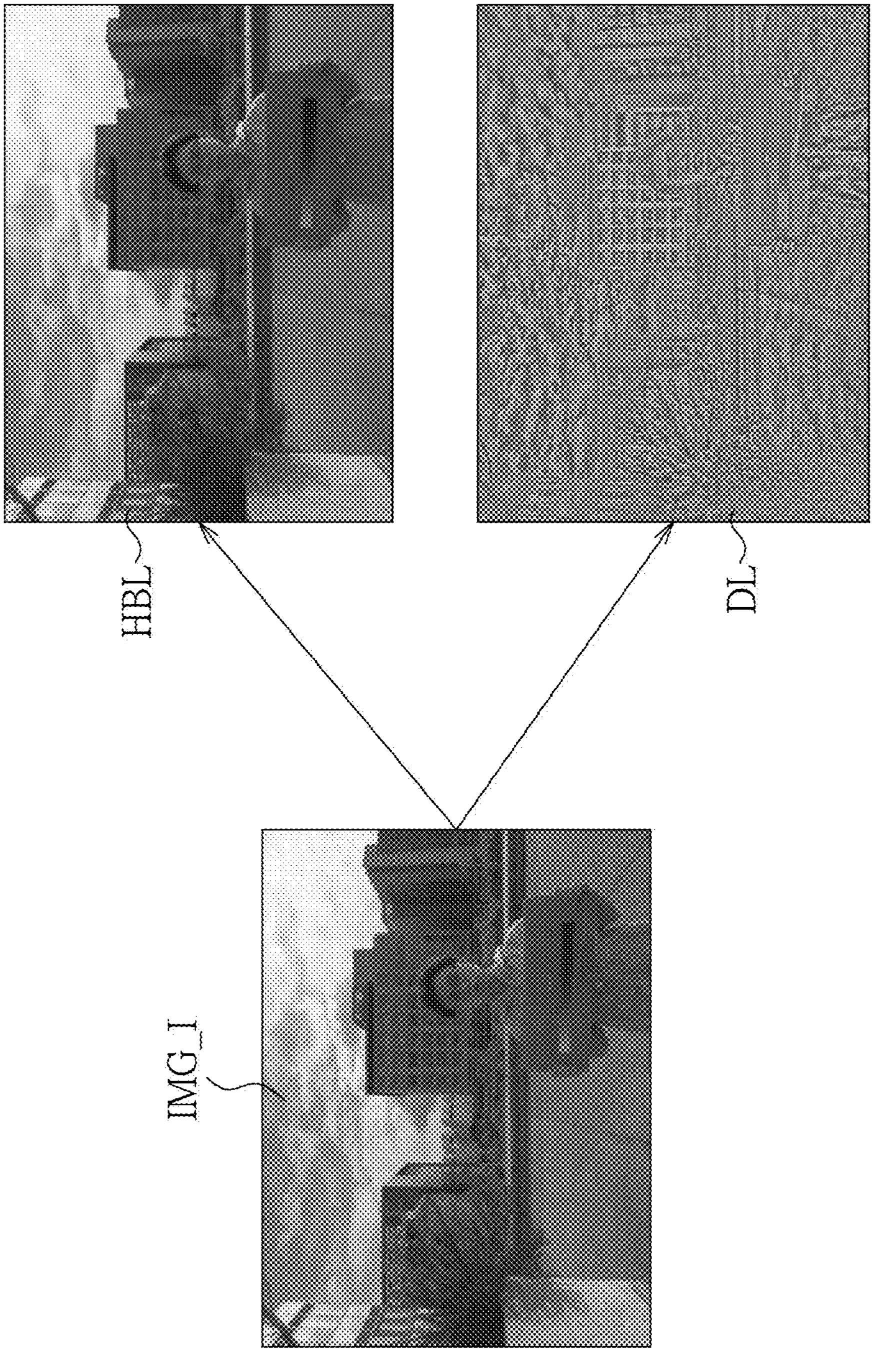
FIG. 3 illustrates an exemplary process of the image decomposition module of the HDR tone mapping system in FIG. 1 decomposing the input image to the high-bit base layer and the detail layer.

FIG. 3 illustrates an exemplary process of the image decomposition module 20 decomposing the input image IMG_I to the high-bit base layer HBL and the detail layer DL. The high-bit base layer HBL includes low-frequency components of the input image IMG_I, such as main shapes and colors and luminance. The detail layer DL includes mid-frequency components and high-frequency components of the input image IMG_I, such as the edges and textures. A Gaussian filter or edge preserving bilateral filter may be applied to decompose the input image IMG_I. The high-bit base layer HBL can be obtained by applying a low-pass filter to the input image IMG_I, while the detail layer DL can be obtained by subtracting high-bit base layer_HBL from the input image IMG_I. With semantic information, the boundaries of the semantic objects (e.g. the semantic object OBJ) can be introduced to edge preserving filters during image decomposition to decrease halos along object boundaries caused by compression. The edge preserving filter can blur small variations of a signal (e.g., noise or texture detail) while preserving large discontinuities (e.g., edges). Thus, by employing the semantic information, the embodiment can improve the result of image decomposition with sharper edges.

Figure 4:
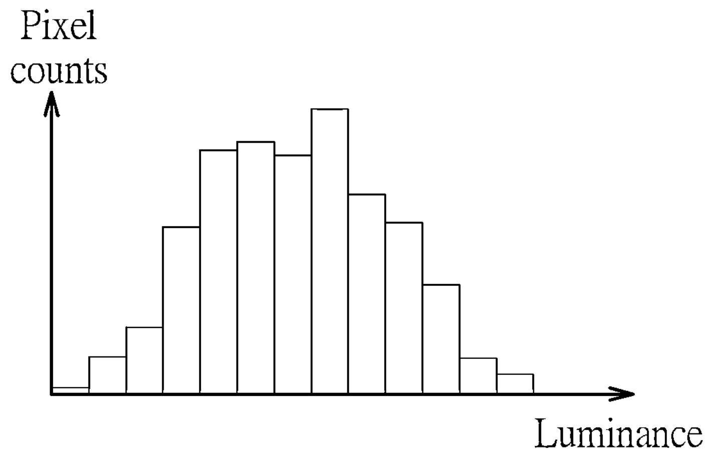
FIG. 4 illustrates statistics of the pixels belonging to the semantic object of FIG. 2.

FIG. 4 illustrates statistics of the pixels belonging to the semantic object OBJ. More specifically, the luminance distribution of the pixels is shown in FIG. 4. With the semantic information the statistics can include luminance distribution and color distribution of the pixels belonging to the semantic object OBJ, and they can both be computed by the statistics module 30. The color distribution of the pixels can be represented by a color histogram, which represents the number of pixels that have colors in each of color ranges that span the color space of the portion of the input image IMG_I corresponding to the semantic object OBJ. The luminance distribution can be a measure of how the luminance (or grayscale) values of pixels are distributed in the portion of the input image IMG_I corresponding to the semantic object OBJ. In some embodiments, the way to compute the luminance distribution of the input image IMG_I is by using a histogram (as shown in FIG. 4). In practice, color and luminance are usually characterized by 255 levels. Thus, with the semantic information, the luminance distribution corresponding to each semantic object can be computed separately to generate a separate tone curve for each semantic object, and the color distribution can be used to approximate the range of color of each semantic object.

Figure 5:
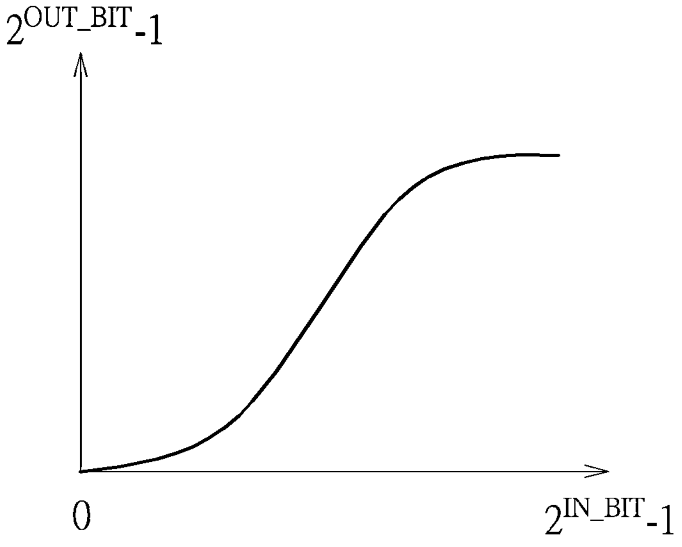
FIG. 5 illustrates a tone curve corresponding to the semantic object of FIG. 2.

FIG. 5 illustrates a tone curve corresponding to the semantic object OBJ. The tone curve is computed by the curve computation module 40 according to the statistics. The tone curve described herewith can be considered as a function that maps the pixel values of the original image to new values that are more suitable for display. More specifically, it maps an input pixel in the range of 0 to $2^{IN\_BIT}$-1 on the X-axis to an output pixel in the range of 0 to $2^{OUT\_BIT}$-1 on the Y-axis. IN_BIT represents the number of bits of an input pixel and OUT_BIT represents the number of bits of an output pixel. The tone curve can be employed to adjust the luminance and contrast of an image by manipulating the shape of the curve. A tone curve can be linear, meaning that it preserves the original tonal values of the image, or nonlinear, meaning that it alters the tonal values of the image in some way. A nonlinear tone curve can be either used to increase or decrease the contrast of the image. With semantic information, the tone curve can be generated for each semantic object (e.g. semantic object OBJ). In the illustration provided in FIG. 5, if the pixels are mainly distributed in the darker tone side, the pixels with darker tone can be compressed with a lower compression ratio than the pixels with brighter tone to avoid detail loss. On the other hand, if the pixels are mainly distributed in the brighter tone side, the pixels with brighter tone can be compressed with a lower compression ratio than the pixels with darker tone to avoid detail loss.

Figure 6:
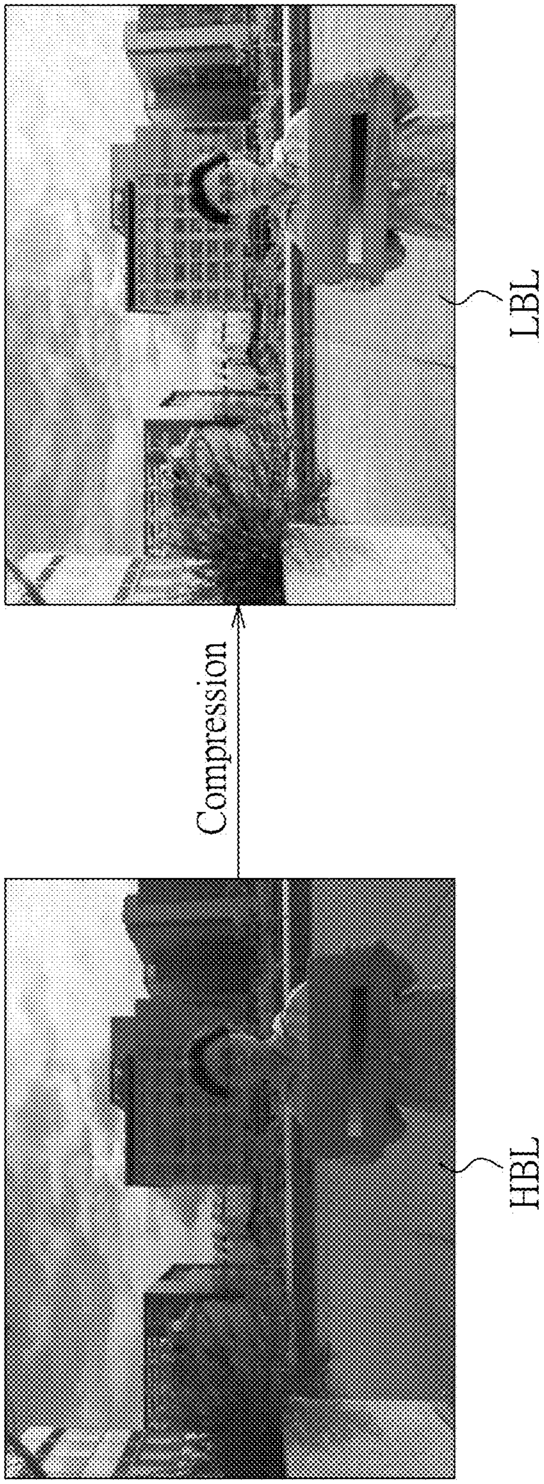
FIG. 6 illustrates an exemplary process of the compression module of the HDR tone mapping system in FIG. 1 converting the high-bit base layer to the low-bit base layer.

FIG. 6 illustrates an exemplary process of the compression module 50 converting the high-bit base layer HBL to the low-bit base layer LBL. It compresses the high-bit base layer HBL to the low-bit base layer LBL by mapping each pixel in the high-bit base layer with the tone curve of FIG. 5. In general, image compression with tone curve aims to reduce the dynamic range of an image while preserving its visual quality. The tone curve of FIG. 5 can be applied to map the pixel values of the original image (e.g., the high-bit base layer HBL) to new values that are compressed and more suitable for display.

To convert the high-bit base layer HBL to the low-bit base layer LBL, different methods can be implemented, such as lossless or lossy compression (e.g., color quantization). Lossless compression preserves all the information from the high-bit base layer HBL, resulting in no quality loss, but also lower compression ratios. Lossy compression discards some information from the high-bit base layer HBL, resulting in some quality loss, but also higher compression ratio. Color quantization reduces the number of colors used in the high-bit base layer HBL, resulting in smaller size, but also possible color banding or posterization. With the semantic information and the statistics (i.e., color range), the pixels belonging to a specific semantic object (e.g., semantic object OBJ) with matching color can be compressed with a specific method and/or the corresponding tone curve (e.g., the tone curve of FIG. 5), thus creating a more desired and precise compression result for converting the high-bit base layer HBL to the low-bit base layer LBL.

Figure 7:
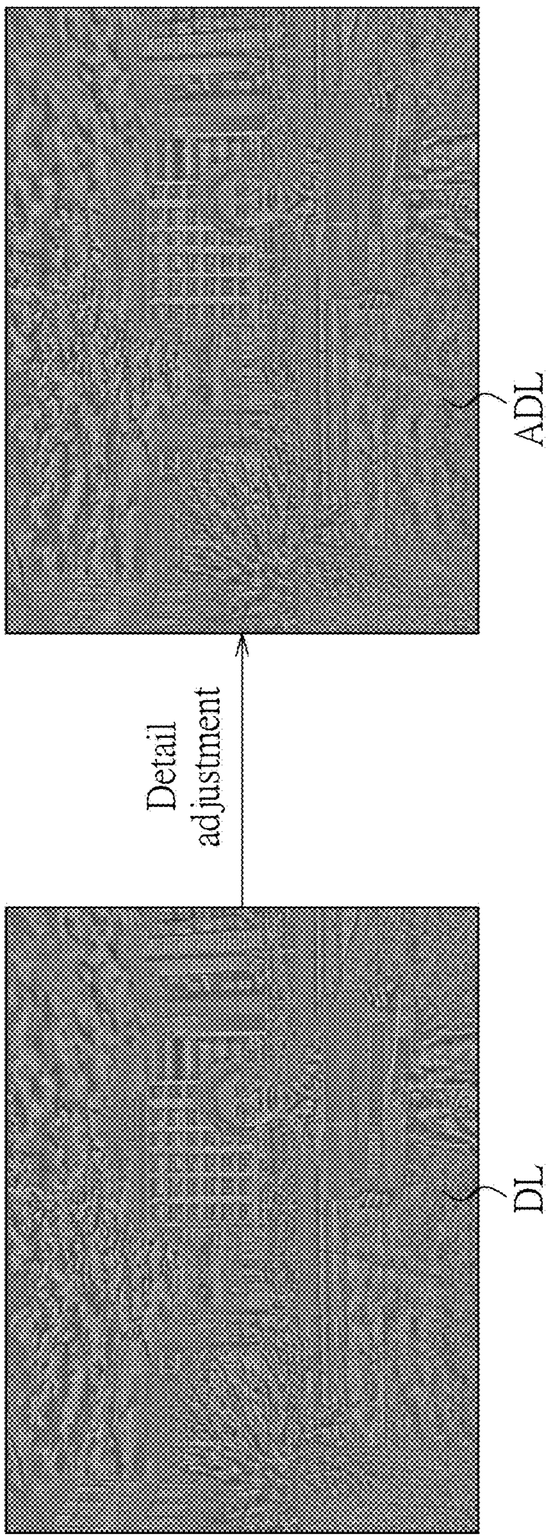
FIG. 7 illustrates an exemplary process of the detail adjustment module of the HDR tone mapping system in FIG. 1 tuning the detail layer according to the semantic information and the statistics to generate the adjusted detail layer.

FIG. 7 illustrates an exemplary process of the detail adjustment module 60 tuning the detail layer DL according to the semantic information and the statistics (i.e., color range) to generate the adjusted detail layer ADL. The detail adjustment module 60 tunes the detail layer DL according to several properties, such as texture, noise level, and the compression level of the pixel.

The adjustment can also depend on the input detail layer DL, for example, details with high magnitude may be assigned with a lower weight to avoid possible overshoot or undershoot along edges.

The above properties and methods are mere examples, and the present invention is not limited thereto. With the semantic information and the statistics (i.e., color range), the pixels belonging to a specific semantic object (e.g., semantic object OBJ) with matching color can be adjusted with a specific method, thus generating a more fine-tuned result for the adjusted detail layer ADL.

Figure 8:
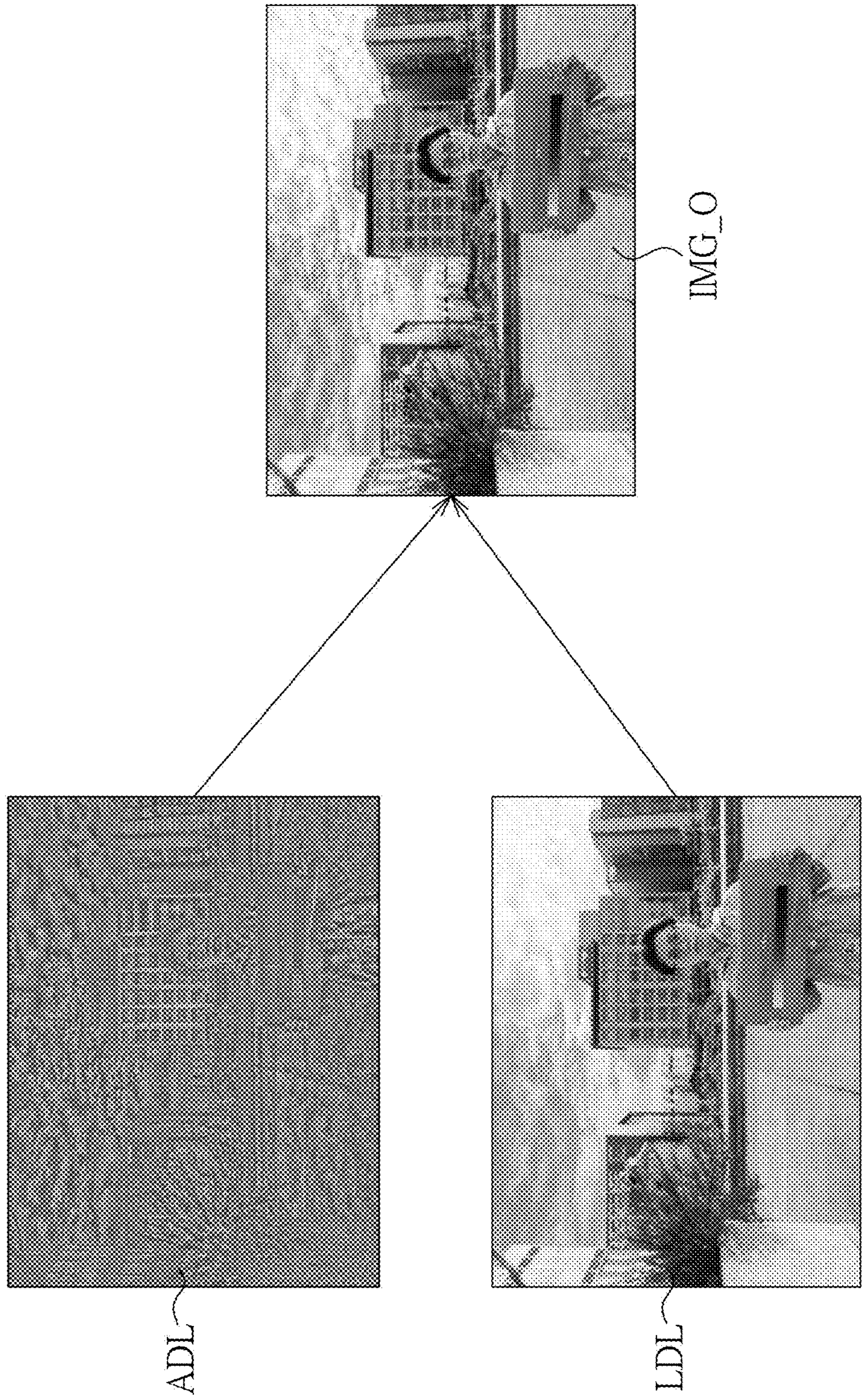
FIG. 8 illustrates an exemplary process of the image reconstruction module of the HDR tone mapping system in FIG. 1 combining the adjusted detail layer and the low-bit base layer to generate the output image.

FIG. 8 illustrates the image reconstruction module 70 combining the adjusted detail layer ADL and the low-bit base layer LBL to generate the output image IMG_O. The output image IMG_O can be an SDR image that has 8 bits to 12 bits per pixel. The image reconstruction process involves adding the adjusted detail layer ADL to the low-bit base layer LBL. The image reconstruction module 70 combines the two layers. The low-bit base layer LBL is a low-frequency image that contains the coarse luminance, structure and color, while the adjusted detail layer ADL is a high-frequency image that contains the fine details and edges of the image. This way, both the global structure and the local details can be preserved in the reconstructed output image IMG_O. However, other methods of image reconstruction can be applied instead of image blending. The present invention is not limited thereto.

In some embodiments, the semantic information may not need to be implemented in the HDR tone mapping system 100. The HDR tone mapping system 100 would then process the input image IMG_I without the semantic information.

Figure 9:
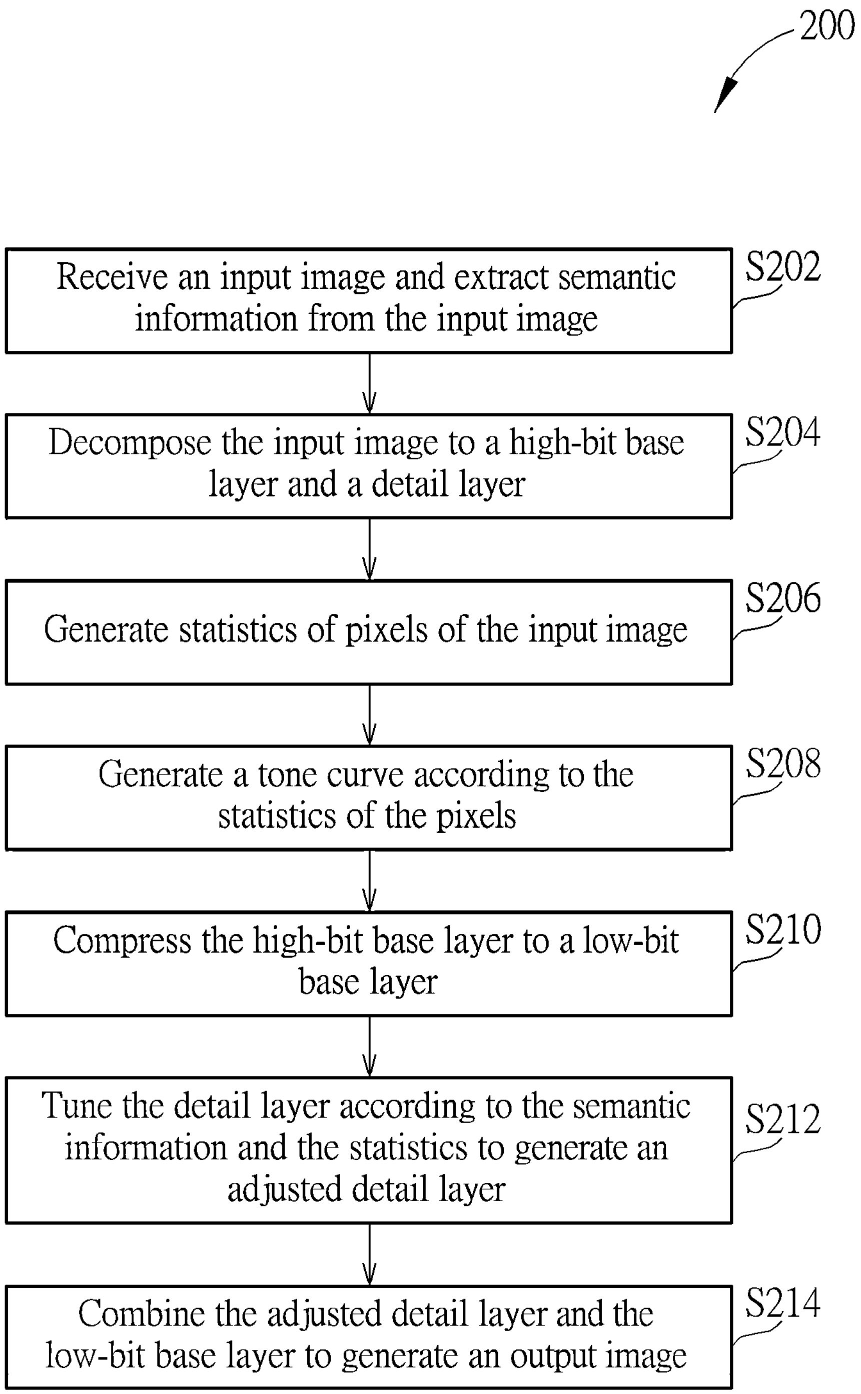
FIG. 9 is a flowchart of an HDR tone mapping method of an embodiment.

FIG. 9 is a flowchart of an HDR tone mapping method 200 of an embodiment. The HDR tone mapping method 200 implemented by the computer includes the following steps:

S202: Receive an input image and extract semantic information from the input image IMG_I;

S204: Decompose the input image IMG_I to a high-bit base layer HBL and a detail layer DL according to the semantic information;

S206: Generate statistics of pixels of the input image IMG_I according to the semantic information;

S208: Generate a tone curve according to the statistics of the pixels;

S210: Compress the high-bit base layer HBL to a low-bit base layer LBL according to the tone curve, the statistics and the semantic information;

S212: Tune the detail layer DL according to the semantic information and the statistics to generate an adjusted detail layer ADL; and S214: Combine the adjusted detail layer ADL and the low-bit base layer LBL to generate an output image IMG_O.

In step S202, the semantic information may be extracted by fully convolutional network (FCN), U-Net, SegNet, Deeplab and/or other commonly used semantic models. A semantic label is assigned to each pixel of the input image to generate at least one semantic object in the input image. The semantic information includes the semantic label of each pixel of the input image IMG_I and the semantic object OBJ.

In step S204, the semantic information can be used to establish the boundaries of the semantic objects during image decomposition by edge preserving filters, which can blur small variations of a signal (e.g., noise or texture detail) while preserving large discontinuities (e.g., edges). Thus, it can decrease halos along object boundaries caused by image compression.

In step S206, the statistics can include luminance distribution and color distribution of the pixels belonging to different semantic objects. With semantic information, luminance and color distribution corresponding to each semantic object can be computed separately to generate a separate tone curve for each semantic object. In the following step S208, a tone curve of each corresponding semantic object may be generated according to the corresponding statistics. Using a tone curve for each separate semantic object can effectively avoid detail or dynamic range loss.

In step S210, with the semantic information and the statistics (i.e., color range), the pixels belonging to a specific semantic object with matching color can be compressed with a specific method and/or the corresponding tone curve, thus creating a more desired and precise compression result for converting the high-bit base layer HBL to the low-bit base layer LBL.

In step S212, with the semantic information and the statistics (i.e., color range), the pixels belonging to a specific semantic object with matching color can be adjusted with a specific method, thus generating a more fine-tuned result for adjusted detail layer ADL.

In step S214, the output image IMG_O is reconstructed from combining the adjusted detail layer ADL and the low-bit base layer LBL. In some embodiments, image blending technique may be applied to perform this task.

Other details of the method 200 have been described in the paragraphs above. It is not repeated herein for brevity. Furthermore, in some embodiments the semantic information may not need to be implemented in the HDR tone mapping method 200. The present invention is not limited thereto.

Figure 10A:
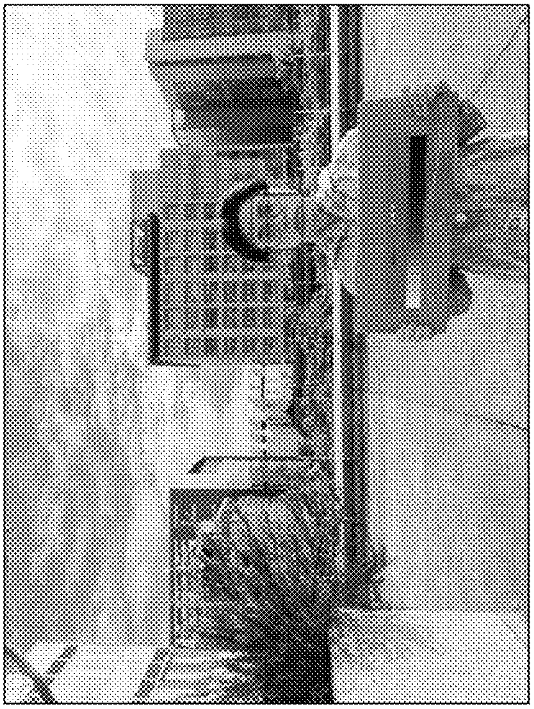
FIG. 10A illustrates an exemplary process of the output image reconstructed without semantic information of an embodiment.
Figure 10B:
FIG. 10B illustrates an exemplary process of the output image reconstructed with semantic information of the embodiment of FIG. 10A.

FIG. 10A illustrates the output image reconstructed without semantic information during the process; FIG. 10B illustrates the output image IMG_O reconstructed with semantic information during the process. In comparison, by adding the semantic information, the HDR tone mapping system 100 can recognize the face in the input image IMG_I, such that after the tone mapping, the face in the output image IMG_O of FIG. 10B can be slightly brighter than that of FIG. 10A. As a result, the contrast, saturation, and details of the output image IMG_O is fine-tuned and enhanced for more quality display.

Figure 11A:
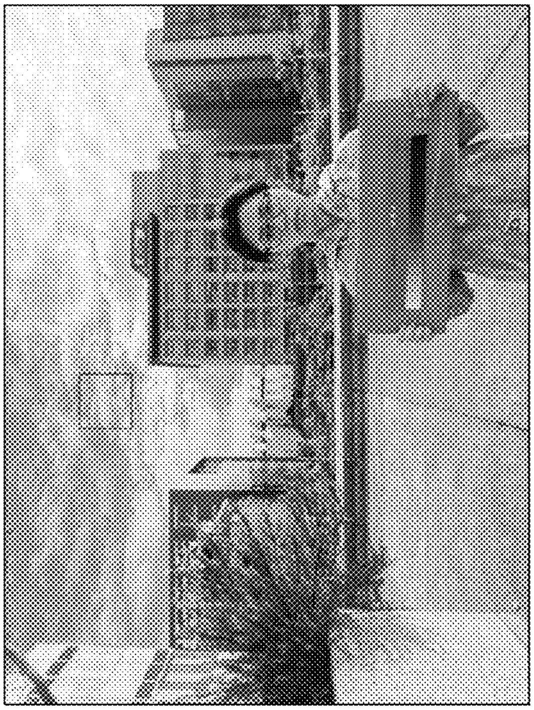
FIG. 11A illustrates an exemplary process of the output image reconstructed without semantic information of another embodiment.
Figure 11B:
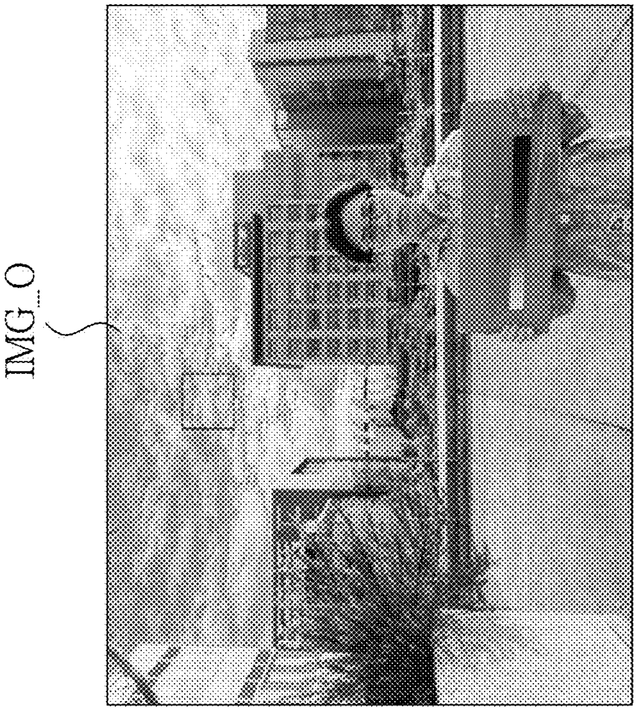
FIG. 11B illustrates an exemplary process of the output image reconstructed with semantic information of the embodiment of FIG. 11A.

FIG. 11A illustrates the output image reconstructed without semantic information during the process; FIG. 11B illustrates the output image IMG_O reconstructed with semantic information during the process. In comparison, by adding the semantic information, the HDR tone mapping system 100 can recognize the sky and the clouds in the input image IMG_I, such that after the tone mapping, the clouds in the output image IMG_O of FIG. 11B can be slightly sharper than that of FIG. 11A. As a result, the contrast, saturation, and details of the output image IMG_O is fine-tuned and enhanced for quality display.

The HDR tone mapping system 100 and/or the HDR tone mapping method 200 described above may be implemented by one or more computers. In further detail, software and hardware hybrid implementations of at least some of the embodiments disclosed may be implemented on a programmable network resident device (which should be understood to include intermittently connected network-aware device) selectively activated or reconfigured by a computer program stored in memory. Such network devices may have multiple network interfaces that may be configured or designed to utilize different types of network communication protocols. A general architecture for some of these devices may be disclosed herein in order to illustrate one or more examples by which a given unit of functionality may be implemented. In some embodiments, at least some of the features or functionalities disclosed herein may be implemented on one or more general-purpose computers associated with one or more networks, such as an end-user computer system, a client computer, a network server or other server system, a mobile computing device (e.g., tablet computing device, mobile phone, smartphone, laptop, and the like), a consumer electronic device or any other suitable electronic device, or any combination thereof. In some embodiments, at least some of the features or functionalities of the various embodiments disclosed may be implemented in one or more virtualized computing environments (e.g., network computing clouds, virtual machines hosted on one or more physical computing machines, or the like).

In some embodiments, the computing instructions may be carried out by an operating system.

In some embodiments, the computers may be on a distributed computing network, such as one having any number of clients and/or servers. Each client may run software for implementing client-side portions of the embodiments. In addition, any number of servers may be provided for handling requests received from one or more clients. Clients and servers may communicate with one another via one or more electronic networks, which may be in various embodiments such as the Internet, a wide area network, a mobile telephone network, a wireless network (e.g., Wi-Fi, 5G, and so forth), or a local area network. Networks may be implemented using any known network protocols.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The terminology used in the description of the various described implementations herein is for the purpose of describing particular implementations only and is not intended to be limiting. As used in the description of the various described implementations and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention. Accordingly, the above disclosure should be construed as limited only by the metes and bounds of the appended claims

What is claimed is:

1. A HDR (High Dynamic Range) tone mapping system comprising one or more processors configured to:

receive an input image and extract semantic information from the input image by performing semantic segmentation on image content of the input image to identify a plurality of semantic objects in the input image;

decompose the input image to a base layer having a first bit depth and a detail layer according to the semantic information;

generate statistics of pixels of the input image according to the semantic information;

generate a tone curve according to the statistics of the pixels;

compress the base layer having the first bit depth to the base layer having a second bit depth less than the first bit depth, wherein, for each semantic object of the plurality of semantic objects, pixels in the base layer having the first bit depth that belong to the semantic object are compressed together according to a respective tone curve, respective statistics, and respective semantic information corresponding to the semantic object;

tune the detail layer according to the semantic information and the statistics to generate an adjusted detail layer; and combine the adjusted detail layer and the base layer having the second bit depth to generate an output image.

2. The HDR tone mapping system of claim 1, wherein the one or more processors are further configured to:

assign a semantic label to each pixel of the input image, wherein the semantic information further comprises the semantic label of each pixel of the input image.

3. The HDR tone mapping system of claim 2, wherein the statistics of the pixels of the input image comprises a luminance distribution of pixels and color distribution of the pixels corresponding to each semantic object of the plurality of semantic objects.

4. The HDR tone mapping system of claim 3, wherein the one or more processors are further configured to generate the tone curve corresponding to each semantic object of the plurality of semantic objects according to the luminance distribution of the pixels corresponding to the semantic object.

5. The HDR tone mapping system of claim 2, wherein the one or more processors are further configured to tune pixels belonging to a semantic object of the plurality of semantic objects in the detail layer together according to the semantic information and the statistics.

6. The HDR tone mapping system of claim 2, wherein the one or more processors are further configured to perform edge preserving filtering to preserve an edge of a semantic object of the plurality of semantic objects in the input image during the decomposition of the input image.

7. The HDR tone mapping system of claim 1, wherein the semantic information is extracted by a fully convolutional network (FCN), a U-Net, a SegNet, and/or a Deeplab.

8. The HDR tone mapping system of claim 1, wherein the base layer having the first bit depth comprises spatially smooth components of the input image, and the detail layer comprises edge and texture components of the input image.

9. The HDR tone mapping system of claim 1, wherein the input image has 18 bits to 24 bits per pixel, and the output image has 8 bits to 12 bits per pixel.

10. A HDR (High Dynamic Range) tone mapping method implemented by a computer, the method comprising:

receiving an input image and extracting semantic information from the input image by performing semantic segmentation on image content of the input image to identify a plurality of semantic objects in the input image;

decomposing the input image to a base layer having a first bit depth and a detail layer according to the semantic information;

generating statistics of pixels of the input image according to the semantic information;

generating a tone curve according to the statistics of the pixels;

compressing the base layer having the first bit depth to a base layer having a second bit depth less than the first bit depth, wherein, for each semantic object of the plurality of semantic objects, pixels in the base layer having the first bit depth that belong to the semantic object are compressed together according to a respective tone curve, respective statistics, and respective semantic information corresponding to the semantic object;

tuning the detail layer according to the semantic information and the statistics to generate an adjusted detail layer; and combining the adjusted detail layer and the base layer having the second bit depth to generate an output image.

11. The HDR tone mapping method of claim 10 further comprising assigning a semantic label to each pixel of the input image, wherein the semantic information further comprises the semantic label of each pixel of the input image.

12. The HDR tone mapping method of claim 11, wherein the statistics of the pixels of the input image comprises a luminance distribution of pixels and color distribution of the pixels corresponding to each semantic object of the plurality of semantic objects.

13. The HDR tone mapping method of claim 12, wherein the tone curve corresponding to each semantic object of the plurality of semantic objects is generated according to the luminance distribution of the pixels corresponding to the semantic object.

14. The HDR tone mapping method of claim 11, wherein pixels belonging to a semantic object of the plurality of semantic objects in the detail layer are tuned together according to the semantic information and the statistics.

15. The HDR tone mapping method of claim 11, further comprising performing edge preserving filtering to preserve an edge of a semantic object of the plurality of semantic objects in the input image during the decomposing of the input image.

16. The HDR tone mapping method of claim 10, wherein extracting semantic information from the input image is performed by a fully convolutional network (FCN), a U-Net, a SegNet, and/or a Deeplab.

17. The HDR tone mapping method of claim 10, wherein the base layer having the first bit depth comprises spatially smooth components of the input image, and the detail layer comprises edge and texture components of the input image.

18. The HDR tone mapping method of claim 10, wherein the input image has 18 bits to 24 bits per pixel, and the output image has 8 bits to 12 bits per pixel.

* * * * *